May 21, 1940.  F. C. BEST  2,201,149
CLUTCH MECHANISM
Filed June 16, 1937   2 Sheets-Sheet 1
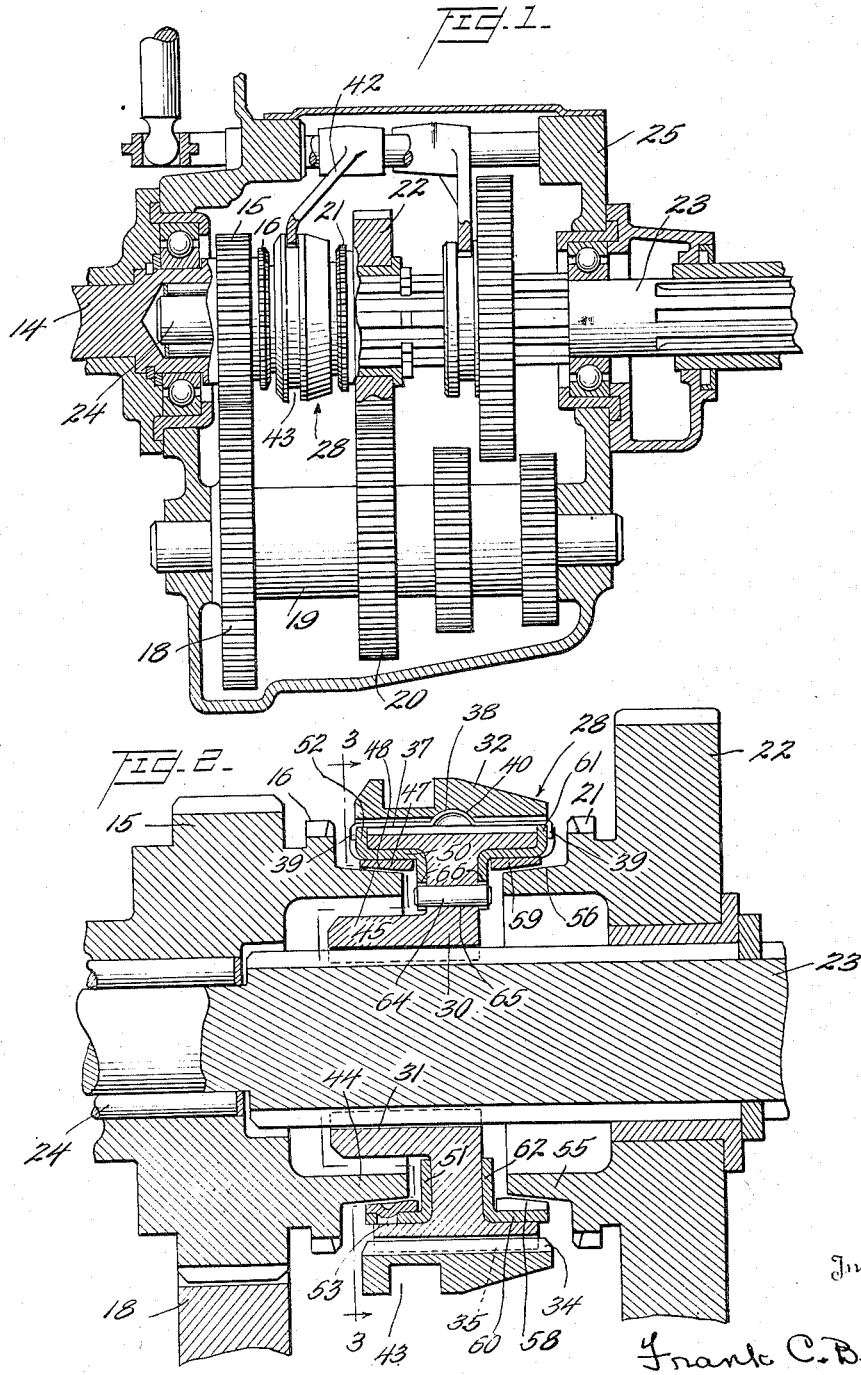

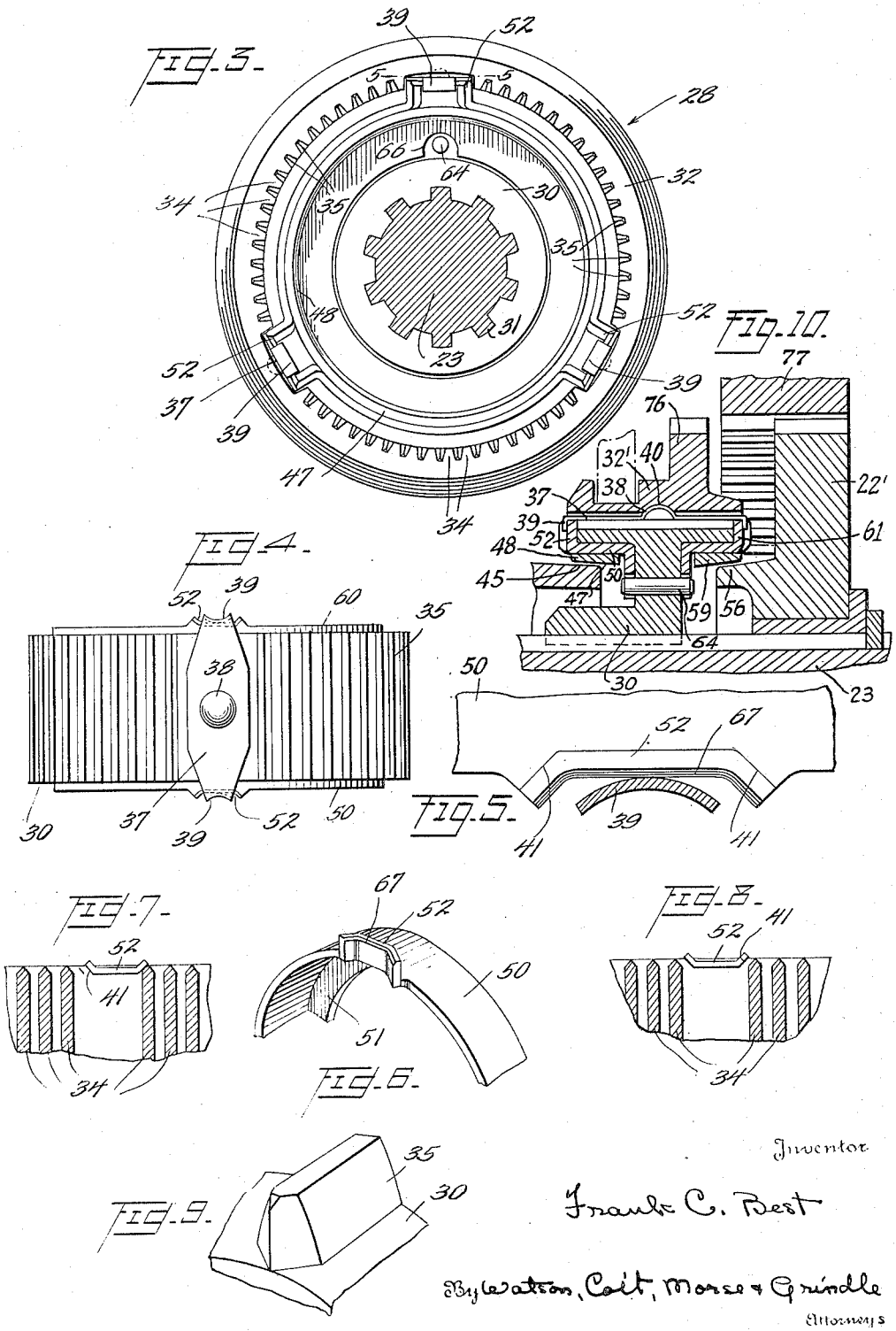

Patented May 21, 1940

2,201,149

UNITED STATES PATENT OFFICE 2,201,149

CLUTCH MECHANISM

Frank C. Best, Detroit, Mich., assignor to Packard Motor Car Company, Detroit, Mich., a corporation of Michigan Application June 16, 1937, Serial No. 148,595

7 Claims. (Cl. 192—53)

This invention relates to change speed gearing, particularly variable speed transmission gearing for motor vehicles, and involves the fundamental features of the invention disclosed in the application of Walter R. Griswold, Serial No. 123,681, filed February 2, 1937, on which the present invention is an improvement.

In the operation of motor vehicles, it is requisite to smooth gear changing that the gears or positive clutch elements which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts, it is now common practice to synchronize the gears or toothed clutch elements to be meshed by various means, for example friction clutches, the latter being engaged immediately prior to the meshing of the two rotating elements for the purpose of bringing them to the same rotational (or peripheral) speed. However, by reason of inexperience or undue haste the driver frequently effects meshing of the cooperating elements without permitting sufficient time to elapse to enable the elements to acquire the same speed, and as a result the elements clash and are thus subject to excessive wear or breakage.

It is therefore one of the principal objects of the invention to provide means for synchronizing toothed elements prior to the meshing thereof which is so constructed as to ensure reasonably satisfactory synchronization before the elements are actually brought into meshing engagement. To accomplish this purpose the invention contemplates either positive retention of the elements in non-meshing relationship until the correct relative speeds of rotation are established or yielding opposition to the relative movement of the elements toward intermeshing position such as to render difficult the meshing of the elements prior to the establishment of proper relative speeds.

More specifically it is an object of the invention to provide, in a transmission gearing for motor vehicles, a device for synchronizing an intermediate element with either of two cooperating elements which are arranged for selective meshing engagement by the first element, and a device which is caused to assume, during lack of proper synchronization, a position in which relative movement of the elements to intermeshing position is retarded, opposed, or prevented and which may assume, when proper synchronization has been established, a second position in which fairly free movement of the elements to intermeshing relation is permitted.

A further object of the invention is to provide a motor vehicle transmission having an improved device for synchronizing the toothed elements in the gear train, which device is simple and effective, reliable in operation, and which will act to minimize the possibility of clashing of the gears during selection of a desired speed ratio.

Further objects and features of the invention will be apparent from the following description, taken in connection with the accompanying drawings, in which—

Figure 1 is a longitudinal vertical sectional view of change speed transmission gearing illustrating the application of the instant invention thereto;

Figure 2 is a vertical sectional view on a larger scale of a portion of the structure shown in Figure 1;

Figure 3 is a transverse sectional view on the line 3—3 of Figure 2;

Figure 4 is a plan view of the structure shown in Figure 3 with the outer element removed;

Figure 5 is a fragmentary sectional view taken substantially on the line 5—5 of Figure 3;

Figure 6 is a perspective view of a portion of one of the elements shown in Figures 3 and 4;

Figures 7 and 8 are fragmentary sectional views illustrating the positions assumed by certain elements of the device prior to and after complete synchronization;

Figure 9 is an enlarged perspective view of a tooth of one of the positive clutch elements; and Figure 10 is a fragmentary vertical sectional view corresponding to a portion of Figure 2, but illustrating a slightly modified method of applying the invention.

For convenience in illustrating the invention, reference is made to the accompanying drawings and specific language is employed to describe the same. It will nevertheless be appreciated that various modifications and alterations of the devices illustrated would readily occur to one skilled in the art and that no limitation of the invention is intended by the use of detailed language. It will also be apparent that many of the features of the invention may be used either separately or conjointly and are applicable to other mechanisms than the transmission gearing in connection with which they are illustrated herein. Thus the gearing selected for illustration is of the so-called slidable key type in which cooperating toothed elements having internal and external teeth respectively are meshed or clutched together, but it will be noted that the synchronizing device described herein may be employed in transmissions of the slidable gear type in which two externally toothed elements are brought into meshing engagement while rotating at substantially the same linear speed. Again, while the synchronizing device shown herein is particularly adapted for the selective coupling of either of two adjacent toothed elements to a shaft, the device may be employed to connect only one element to a shaft or to bring only two gears into meshing relation.

Mention is made herein, for convenience, of the synchronization and of the synchronous movement of two rotating elements. It will be appreciated that by synchronous rotation of coaxial toothed elements or clutches, reference is made to rotation of such elements at the same angular speed; as applied to externally toothed intermeshing elements or gears, or to a pair of cooperating externally and internally toothed elements of different diameter, synchronous rotation is such relative rotation as will give the same linear speed of the cooperating toothed portions of the two elements.

The transmission mechanism selected for the purpose of illustrating the invention is similar in all essential details to that shown in the prior patent to Vincent No. 1,901,713, granted March 14, 1933, but the invention is of course not restricted to use with such mechanism. The gearing train is more or less conventional and includes a driving shaft 14 and a driving gear 15 having a toothed clutch portion 16 formed integrally therewith, gear 15 meshing with a gear 18 on an idler shaft 19. A second gear 20, mounted on the idler shaft and rotating with the gear 18, meshes with a gear 22, which is provided with a toothed clutch portion 21. The gear 22 is freely rotatable on a driven shaft 23, which is in turn journalled as indicated at 24 within the gear 15 and driving shaft 14. The shafts 14 and 23 are journalled in and at opposite ends of the transmission housing 25 and are thereby supported in coaxial relation. Additional gears for securing further speeds are also illustrated in the drawing, but are unnecessary to an understanding of the instant invention.

A synchronizing device indicated generally at 28, is carried on the driven shaft 23 intermediate the clutch elements 16 and 21 and is so constructed as to be capable of selectively coupling either the gear 15 or the gear 22 to the driven shaft 23, whereby the driven shaft 23 may be rotated either at the speed of rotation of the driving shaft 14, by direct coupling of the gear 15 and shaft 14 thereto, or at a reduced speed through the idler shaft 19 and gears 18 and 20, by coupling of the gear 22 thereto. This type of transmission mechanism is now wholly conventional and the details thereof form no part of the instant invention.

The synchronizing device 28 is illustrated more particularly in Figures 2 to 6 inclusive and preferably includes two primary parts, an annular element 30 which is splined as indicated at 31 to the driven shaft 23 and an annular element 32 which is in turn splined to the element 30. The splined connection between the elements 30 and 32 comprises internal teeth 34 on the latter and external teeth 35 on the former, the teeth 34 being also adapted for selective meshing relation with the teeth of the clutch portions 16 and 21 of the adjacent gears 15 and 22. A plurality of spring detents 37, each of which may comprise a generally flat body portion formed to provide a centrally disposed parti-spherical projection 38, is associated with the element 30 in a manner hereinafter more particularly explained and is so supported that the projection 38 thereof is normally received in a complementary parti-spherical recess 40 formed in the inner face and substantially in the median plane of the element 32. The arrangement is such that when these detents, of which three are shown in the drawing, are seated in the recesses 40, the elements 30 and 32 are yieldingly locked against relative axial displacement. Thus when the element 32 is displaced to either the right or the left from the position in which it is shown in Figure 2 of the drawings, for instance by means of a conventional shifter fork 42 engaging an annular groove 43 in the periphery of the element 32, the element 30 will tend to move axially therewith on the shaft 23 to engage and render operative either of two synchronizing clutches which are hereinafter more particularly described. Continued movement of the element 32, however, will tend to force the projections 38 of the detents 37 out of the recesses 40 in the element 32, the flat body portions of the detents 37 being flexed inwardly, and the element 32 will slide axially on the element 30 to engage either the clutch portion 16 of the gear 15 or the clutch portion 21 of the gear 22, depending on the direction of axial displacement, whereby either the gear 15 or the gear 22 will be positively clutched to the driven shaft 23.

The cooperating members of the synchronizing clutch acting between the gear 15 and the element 30 are preferably of the frictional type and may comprise a laterally directed annulus 44 formed integrally with the gear 15 and provided with an external conical clutch surface 45, and an annular member 47 carried by the element 50 and having a complementary internal conical surface 48 for engagement therewith. The surface 48 of the annular member 47 may be scored or grooved internally and is secured, for example by pressing, within an annular element 50, the latter having an inwardly directed radial flange 51 and a plurality of circumferentially spaced, outwardly directed segmental flanges which may be shaped as shown more particularly in Figure 5 and which are referred to for convenience hereinafter as teeth 52, three of which teeth being shown in the drawings. To further ensure rigid connection between the member 47 and the element 50, the latter may be provided with a plurality of circumferentially spaced apertures 53 into which the member 47 may be pressed.

Similarly the gear 22 is provided with a laterally directed annulus 55 which is formed to provide a conical clutch surface 56 which may cooperate with the complementary clutch surface 58 formed on an annular element 59, the latter being shrunk within an annular element 60 which is formed to provide a plurality of circumferentially spaced outwardly directed segmental flanges, referred to as teeth 61, and an annular inwardly directed radial flange 62. The flanges 51 and 62 of the annular elements 50 and 60 are maintained in the position in which they are shown in Figure 2 at either side of the element 30 by means of the hereinbefore described detents 37, each of these detents being provided at its opposite ends with an inwardly directed flange 39 which is of generally arcuate shape and which engages the axial outer face of a tooth 52 or a tooth 61 on the elements 50 and 60, the detents constituting generally U-shaped spring clips.

It will be observed that the elements 50 and 60 may be formed of sheet metal and each of the teeth 52 and 61 thereof comprises a generally flat radial portion or tongue, with which a flange 39 of a detent 37 is engaged, and portions at either side of this flat portion which are inclined with respect thereto to afford cam surfaces 41 which serve a purpose hereinafter described. It will be observed that the flanges 39 of the detents 37 are so dimensioned as to permit of relative circumferential displacement of the detents and the elements 50 and 60, the detent flanges sliding on the flat faces of the teeth 52 and 61 during such displacement. This circumferential displacement of the elements 50 and 60 with respect to the detents 37 and with respect to the annular element 30 is limited by means of a pin 64, the pin being driven or otherwise secured within an aperture 65 in the element 30 and having the projecting ends thereof disposed in a substantially semi-circular recess 66 in the inwardly directed flanges 51 and 62 of the annular elements 50 and 60, the recess 66 being of somewhat larger radius than the pin 64.

At spaced points about the circumference of the element 30, three such points being illustrated, a few of the teeth 35 thereof are removed and similarly corresponding groups of teeth 34 are removed from the element 32, the detents 37 being positioned at such points. The number of teeth 34 removed at each such point, for example two, is sufficient to permit the element 32 to be slid axially on the element 30 past the teeth 52 or 61 provided the latter are positioned in alignment with the space formed by the removal of the teeth 34. If, however, the teeth 52 or 61 have been displaced circumferentially with respect to the element 30, axial movement of the element 32 will result in engagement of the teeth 34 with one or the other of the cam surfaces 41 so as to block or retard such axial movement.

The operation of the device will now be apparent. Assuming that it is desired to couple the gear 15 to the shaft 23, the shifter fork 42 is displaced toward the left from the position shown in Figures 1 and 2, and the element 32 is displaced toward the left, carrying therewith the element 30 by reason of the action of the detents 37, thus engaging the cooperating friction clutch surfaces 45 and 46. The engagement of these surfaces not only tends to establish the same speed of rotation in the element 30 and the gear 15, but serves also to rotate the element 50 with respect to the element 30 so that the teeth 52 are no longer aligned with the spaces formed by the removal of the several groups of teeth 34 from the element 32. Thus when the ends of the adjacent teeth 34 engage the cam surfaces 41 of the teeth 52, the element 32 can be displaced no further to the left, except by the use of excessive force, and the operator is compelled to delay the completion of the shifting operation until the element 30 and the gear 15 are rotating at the same or substantially the same speed. He will then be able to further displace the element 32 toward the left, the element 50 being rotated slightly by the camming action of the teeth 34 on the cam surfaces 41 of the teeth 52 which results in re-establishment of the alignment of the teeth 52 with the spaces formed by the removal of the teeth 34, the ends of the teeth 34 adjacent the teeth 52 being pointed to facilitate this action and also chamfered. When this alignment is accomplished, the element 32 may be freely moved toward the left into cooperative clutching engagement with the toothed portion 16 of the gear 15.

The positions assumed by the teeth 52 prior to and after complete synchronization are shown in Figures 7 and 8. It will be observed that the teeth 52 are dimensioned circumferentially so as to enable them to move between the adjacent teeth 34 with slight mechanical clearance only.

The construction is of course duplicated at the opposite side of the elements 30 and 32 so that on displacement of the element 32 to the right, the operator is compelled to delay the completion of the shifting movement until the elements to be coupled have been properly or at least substantially synchronized. Preferably the positive clutch teeth 16 and 21 are pointed and chamfered at one end as shown more particularly in Figure 9.

By varying the angular disposition of the cam surfaces 41 on the teeth 52 and 61, the shifting of the element 32 into positive clutch position with either of the clutch portions 16 or 21, may be rendered either more or less difficult, but in any event it will be appreciated that positive clutching can be effected, prior to the complete synchronization of the cooperating clutch elements, only by the application of sufficient force to overcome the torque applied to the element 30 by the synchronizing friction clutch.

It will be observed that this construction, while functioning as effectively and positively as that described in the prior application hereinbefore referred to, is much more simple and is composed of a much less number of parts. The component elements of the device may be inexpensively constructed and assembled, for example, the elements 50 and 60 may be formed of sheet metal stampings and the detents 37, which serve the two-fold purpose hereinbefore set forth, may likewise be readily stamped from spring steel. To facilitate assembly of these detents, the teeth 52 and 61 may be chamfered slightly at their outer sides as shown at 67 and the detents are preferably bowed upwardly so that when the element 32 is slid axially over the detents and into assembled relation in the unit, the detents will exert the desired pressure to force the projections 38 thereof into the recesses 40. The dis-assembling of the elements of the unit is similarly readily effected by the removal of the element 32.

Figure 10 illustrates the application of the invention to a gear train of the so-called slidable gear type, in which two gears are relatively displaced into intermeshing relation for the purpose of establishing the drive or selecting a given ratio. Thus it is here desired to move an annular element 32' having a toothed portion 76 into meshing relation with a gear 77 and to establish prior to the engagement of the toothed elements a relative rotational speed such that the meshing may be effected without difficulty and with a minimum of noise. To this end the annular element 32' is splined to the element 30, which is in turn splined to the shaft 23. A gear 22' meshes with the gear 77 and is provided with a laterally directed annulus formed to provide a clutch surface 56 with which a complementary clutch member 59 carried by the element 30 may engage. The construction and mode of operation are otherwise quite similar to that described in connection with the remaining figures of the drawings, the frictional engagement being established prior to the engagement of the toothed portion 76 of the annulus 32' with the gear 77, so that the latter is brought up to the proper speed by the gear 22' which has the same number of teeth as the toothed portion 76.

Having thus described the invention, what is claimed as new and desired to be secured by Letters Patent is:

1. In apparatus of the class described, the combination with coaxial rotating elements, of means including a member displaceable axially for effecting positive coupling between said elements, means including a member displaceable axially for effecting frictional coupling between said elements, a releasable connection between said members, whereby said frictional coupling may be established by axial displacement of said first named member and prior to the establishment of said positive coupling, means responsive to differing rotational speeds of said elements for opposing axial displacement of said first named member, said last named means including a device movable with said second named member for slight circumferential displacement with respect to said first named member, and an element forming part of said releasable connection and associated with said device and second named member to retain the latter in assembled relation.

2. In apparatus of the class described, the combination with an axially movable positive clutch means, of a synchronizing friction clutch means associated therewith, said friction clutch means including an axially movable supporting member and a device affording a friction clutch surface carried by said member, and a spring element retaining said device and member in assembled relation, said spring element engaging said positive clutch means to releasably connect the latter to said friction clutch means for axial displacement therewith.

3. In apparatus of the class described, the combination with an axially movable positive clutch means, of a synchronizing friction clutch means associated therewith, said friction clutch means including an axially movable supporting member and a device affording a friction clutch surface carried by said member for circumferential displacement with respect thereto, means acting between said member and device to limit such relative circumferential displacement, and a spring element retaining said device and member in assembled relation, said spring element engaging said positive clutch means to releasably connect the latter to said friction clutch means for axial displacement therewith.

4. In a clutch, the combination with an axially movable supporting member, of a toothed clutch element mounted on said supporting member for axial movement with respect thereto, a synchronizing device affording a friction clutch surface associated with said supporting member, and means releasably connecting said supporting member and clutch element for concurrent axial displacement, said means acting to retain said device and supporting member in assembled relation.

5. In a clutch, the combination with an axially movable supporting member, of a toothed clutch element mounted on said supporting member for axial movement with respect thereto, and a synchronizing device affording a friction clutch surface associated with said supporting member for axial movement therewith and for limited circumferential movement with respect thereto, said device comprising a sheet metal stamping having at least one outwardly directed tongue formed thereon, said tongue assuming a position intermediate adjacent teeth on said clutch element to permit free axial movement of the latter, or a position of axial alignment with a tooth of said clutch element to retard axial movement of the latter, on circumferential movement of said device to either of two positions with respect to said member.

6. In a clutch, the combination with an axially movable supporting member, of a toothed clutch element mounted on said supporting member for axial movement with respect thereto, a synchronizing device affording a friction clutch surface associated with said supporting member for axial movement therewith and for limited circumferential movement with respect thereto, said device comprising a sheet metal stamping having at least one outwardly directed tongue formed thereon, said tongue assuming a position intermediate adjacent teeth on said clutch element to permit free axial movement of the latter, or a position of axial alignment with a tooth of said clutch element to retard axial movement of the latter, on circumferential movement of said device to either of two positions with respect to said member, and a spring clip retaining said member and device in assembled relation and yieldingly engaging said clutch element to cause said member to move axially with said element.

7. A unit for use with a synchronizing clutch comprising a supporting member, devices affording friction clutch surfaces disposed at either side of said member, a plurality of U-shaped spring clips bridging said member and engaging said devices to maintain the latter in assembled relation with said member, and a toothed clutch element surrounding said member and said clips to retain the latter against unintentional displacement, said clips yieldingly engaging said element to urge said member to axial movement therewith.

FRANK C. BEST.